United States Statutory Invention Registration [19]

[11] Reg. Number: H860

Job [43] Published: Dec. 4, 1990

[54] METHOD FOR POLYMERIZING ALPHA OLEFINS

[75] Inventor: Robert C. Job, Houston, Tex.

[73] Assignee: Shell Oil Company, Houston, Tex.

[21] Appl. No.: 301,919

[22] Filed: Jan. 26, 1989

[51] Int. Cl.[5] ..... C08F 4/00; C08F 251/00; C08F 253/00; C08F 255/00

[52] U.S. Cl. ..... 525/247

[58] Field of Search ..... 525/247

[56] References Cited

U.S. PATENT DOCUMENTS

| | | | |
|---|---|---|---|
| 3,773,743 | 11/1973 | Ainsworth et al. | 260/94.9 F |
| 3,965,083 | 6/1976 | Jezl et al. | 526/65 |
| 4,107,416 | 8/1978 | Giannini et al. | 526/114 |
| 4,143,223 | 3/1979 | Toyota et al. | 526/125 |
| 4,234,716 | 11/1980 | Cuypers et al. | 528/483 |
| 4,326,048 | 4/1982 | Stevens et al. | 526/68 |
| 4,329,253 | 5/1982 | Goodall et al. | 252/429 B |
| 4,364,853 | 12/1982 | Mink et al. | 252/429 B |
| 4,393,182 | 7/1983 | Goodall et al. | 526/125 |
| 4,400,302 | 8/1983 | Goodall et al. | 252/429 B |
| 4,414,132 | 11/1983 | Goodall et al. | 502/169 |
| 4,520,163 | 5/1985 | Goodall | 525/53 |
| 4,529,780 | 7/1985 | Foerster | 526/142 |
| 4,543,389 | 9/1985 | Burstain et al. | 525/53 |
| 4,551,509 | 11/1985 | Takayuki | 526/68 |
| 4,650,841 | 3/1987 | Levresse et al. | 526/68 |

FOREIGN PATENT DOCUMENTS

| | | | |
|---|---|---|---|
| 0021478 | 1/1981 | European Pat. Off. | 526/153 |
| 0067645 | 6/1982 | European Pat. Off. . | |
| 0116248 | 12/1983 | European Pat. Off. . | |
| 0225099 | 6/1987 | European Pat. Off. | 525/247 |
| 2841646 | 4/1980 | Fed. Rep. of Germany . | |
| 074109 | 11/1979 | Japan . | |
| 164309 | 3/1983 | Japan . | |
| 164310 | 3/1983 | Japan . | |
| 179504 | 3/1983 | Japan . | |
| 164307 | 9/1984 | Japan . | |
| 174603 | 10/1984 | Japan . | |
| 2094319 | 2/1982 | United Kingdom . | |
| 2104083 | 7/1982 | United Kingdom . | |

*Primary Examiner*—John S. Maples
*Assistant Examiner*—Philip Tucker
*Attorney, Agent, or Firm*—Peter A. Bielinski

[57] ABSTRACT

An alpha olefin polymerization reaction using a first alpha olefin monomer and a magnesium supported titanium halide/aluminum alkyl catalyst system wherein said system comprises:

(a)
- (i) a procatalyst component;
- (ii) a cocatalyst component; and
- (iii) a selectivity control agent;

(b) discontinuing addition of the procatalyst component;

(c) adding sufficient sterically hindered phenolic hydrocarbon to the polymerization reaction contents to terminate the reaction; and (d) either
- (i) adding an amount of a second alpha olefin monomer and then adding an organoaluminum compound to restart the reaction; or
- (ii) adding an amount of said first alpha olefin monomer and a second alpha olefin monomer and then adding an organoaluminum compound to restart the reaction; or
- (iii) adding an amount of said first alpha olefin monomer and a second alpha olefin monomer and then adding an amount of an organoaluminum compound and additional procatalyst.

13 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR POLYMERIZING ALPHA OLEFINS

BACKGROUND OF THE INVENTION

The invention relates to a method for polymerizing alpha olefins by terminating a polymerization reaction, which is either liquid pool, gas phase or similar, and uses a high activity, magnesium supported, titanium halide/aluminum alkyl catalyst system.

Polymerization of alpha mono-olefin monomers by means of supported coordination catalyst systems can occur using catalyst systems which comprise (a) a procatalyst, (b) a cocatalyst and (c) a selectivity control agent, wherein (a) is a highly active solid composition which comprises magnesium, tetravalent titanium, halogen and one or more electron donors; (b) is an organoaluminum compound like aluminum alkyl; and (c) is an electron donor. Components (b) and (c) may be wholly or partly complexed with each other prior to being combined with the procatalyst.

Olefin polymerizations using magnesium supported titanium halide/aluminum alkyl catalyst systems are well known in the art. Recently, there has developed a need to terminate the olefin polymerization reaction rapidly and restart the reaction, obverting a long down time, and adding stability to the overall polymerization product.

It is known that the polymerization of monoolefins, particularly alpha olefins, such as propylene, in slurry or bulk phase polymerizations can be terminated by the addition of substances, such as alcohols, ketones, ethers, aldehydes, carboxylic acids, phenols, water, oxygen and carbon oxides, see U.S. Pat. Nos. 4,326,048 and 4,551,509. It is known that the polymerization of olefins, such as propylene or ethylene in gas phase processes can be terminated by the addition of carbon oxides.

In U.S. Pat. No. 4,326,048 carbon oxides were used to terminate a reversible gas phase alpha olefin polymerization reaction that utilized a titanium halide/aluminum alkyl catalyst system. The disclosed process involved the steps of (a) discontinuing catalyst addition by quenching reactor liquid flow and reactor off gas flow, (b) injecting an amount of carbon oxide sufficient to terminate the reaction, (c) discontinuing the recycle gas flow, (d) venting and flushing the polymerization reactor, (e) restarting the quench liquid, off gas, and recycle gas flows (f) injecting an amount of aluminum alkyl sufficient to initiate polymerization, and (g) resuming titanium halide addition.

This known process has several drawbacks. Under typical operating conditions for propylene polymerization, it is difficult to eliminate carbon oxides without a long down time in the polymerization system. It is expensive and difficult to remove the carbon oxide from the non-polymerized monomer because the volatility of the carbon oxide is similar to the volatility of the typical monomer used.

Another process for deactivating a polymerization reaction is taught in U.S. Pat. No. 4,551,509. In that patent, the catalyst system to be deactivated uses a procatalyst compound of a transition metal of groups IVa and VIa of the Periodic Table and an organometallic compound of a metal of groups I to III of the Periodic Table. Polyalkylene glycol is introduced in the reactor to deactivate the catalyst. In the patent, it is disclosed that the glycol component is only usable as a deactivation agent in a gas phase reaction, and that it does not provide any additional advantages, such as acting as a stabilizer, adding for the resulting polymer.

Another U.S. Pat. No. 3,965,083 discloses a method for terminating an alpha olefin polymerization using water as the reversible polymerization terminator. Water, like the polyalkylene glycol, does not additionally act as a stabilizer or antioxidant in the resultant polymer product.

U.K. Patent Application GB 2,094,319A discloses the use of compounds having at least one C—O bond to partially deactivate a Mg-supported olefin polymerization catalyst. Methyl p-toluate is disclosed. This is not a sterically hindered phenolic compound. Furthermore, it is not a high molecular weight phenolic compound.

A need has developed for a method which is capable of (1) reversible alpha olefin polymerization termination in gas phase, solvent slurry, liquid pool and bulk phase polymerization reactions and/or (2) acting as a stabilizer in the subsequently prepared polymer. It has now been discovered that certain polymerization termination components can act as reversible termination components in the polymerization process and as stabilizers in the final polymerized product.

SUMMARY OF THE INVENTION

The present invention involves three methods for polymerizing alpha olefins. The three methods involve:

(a) starting an alpha olefin polymerization reaction using a first alpha olefin monomer and using a magnesium supported titanium halide/aluminum alkyl catalyst system wherein said system comprises:
  (i) a procatalyst component obtained by halogenating a magnesium compound with a halide of tetravalent titanium;
  (ii) a cocatalyst component comprising an organoaluminum compound;
  (iii) a selectivity control agent;
  (b) discontinuing addition of the procatalyst component;

(c) adding sufficient sterically hindered phenolic hydrocarbon to the polymerization reaction contents to terminate the reaction; and (d) either (i) adding an amount of a second alpha olefin monomer and then adding an organoaluminum compound to restart the reaction; or
  (ii) adding an amount of said first alpha olefin monomer and a second alpha olefin monomer and then adding an organoaluminum compound to restart the reaction; or
  (iii) adding an amount of said first alpha olefin monomer and a second alpha olefin monomer and then adding an amount of organoaluminum compound and additional procatalyst.

DESCRIPTION OF THE INVENTION

The present invention relates to a method usable in a variety of polymerization processes, such as liquid phase and gas phase polymerization processes, for rapidly and reversibly terminating polymerization reactions using a magnesium supported, titanium halide/aluminum alkyl catalyst system. Typical liquid phase and gas phase polymerizations are known in the art, see for example U.S. Pat. Nos. 4,551,509 and 4,326,048. The present invention relates to the novel use of sterically hindered phenol compounds to provide both reversible termination of a polymerization reactions and stability in the resultant polymer.

Olefin polymerization catalysts usable in the present process can comprise a solid component, the procatalyst (comprising at least magnesium, titanium and a halide, like chlorine), and a cocatalyst, such as an organoaluminum compound. These procatalysts and cocatalysts are referred to when combined as supported coordination catalysts. The activity and stereospecific performance of such compositions is generally improved by incorporating an electron donor (Lewis base) in the procatalyst (inside electron donor) and/or by employing a third catalyst component, i.e. an electron donor (outside electron donor) also known as a selectivity control agent. The selectivity control agent may be complexed in whole or in part with the activating organoaluminum compound. For convenience of reference, the solid titanium-containing constituent of such catalysts will be referred to hereinafter as "procatalyst", the organoaluminum compound, whether used separately or partially or totally complexed with an electron donor, will be referred to as "cocatalyst", and the outside electron donor compound, whether used separately or partially or totally complexed with the organoaluminum compound, will be referred to as the "selectivity control agent" (SCA).

Preferred methods for preparing procatalysts of this type are described in U.S. Pat. Nos. 4,329,253; 4,393,182; 4,400,302; and 4,414,132. These procatalysts are highly active and stereospecific. The typical manner of preparing such procatalysts involves the reaction of the magnesium compound, a halide of tetravalent titanium and electron donor, optionally in the presence of a halohydrocarbon. It may not be necessary to use a halohydrocarbon in all situations. The resulting combined particles are then contacted with additional quantities of tetravalent titanium halide, like $TiCl_4$. The preparations for the procatalyst are completed by washing off excess $TiCl_4$ using light hydrocarbons (e.g., isooctane and isopentane) and drying the result.

Preferred procatalysts can be selected from one of the following groups:

Group (I) is a composition prepared by reacting a solid component obtained by halogenating a magnesium compound of the formula Mg R'R", wherein R' is an alkoxide, alkyl carbonate or aryloxide, and R" is an alkoxide, alkyl carbonate or an aryloxide group or a halogen, with a halide of tetravalent titanium, reacting this product with a first electron donor and then with a second electron donor therein forming a halogenated product, and therein reacting said halogenated product with a halide of tetravalent titanium; and Group (II) is a composition comprising: (a) a reaction product of an organoaluminum compound and an electron donor, and (b) a solid component which has been obtained by halogenating a magnesium compound with the formula Mg $R_1R_2$ wherein $R_1$ is an alkyl, aryl, alkoxide or aryloxide group, and $R_2$ is an alkyl, aryl, alkoxide or aryloxide group or halogen, with a halide of tetravalent titanium in the presence of a halohydrocarbon, and contacting the halogenated product with a tetravalent titanium compound.

The first step in preparing the procatalysts of the present invention comprises halogenating a magnesium compound of the formula MgR'R" where R' is an alkoxide, alkyl carbonate or aryloxide group and R" is an alkoxide, alkyl carbonate or aryloxide group, or halogen, with a tetravalent titanium halide in the optional presence of a halohydrocarbon and in the presence of one or more electron donors, therein forming a halogenated product.

Examples of halogen containing magnesium compounds that can be used as starting materials for the halogenating reaction are alkoxy, alkyl carboxy and arlyoxy magnesium halides, such as isobutyoxy magnesium chloride, ethoxy magnesium bromide, phenoxy magnesium iodide, cumyloxy magnesium bromide and naphthenoxy magnesium chloride. Preferred magnesium compounds to be halogenated are selected from magnesium dialkoxides, magnesium bis(alkyl carbonates) and magnesium diaryloxides or mixtures thereof. In such compounds the alkoxide groups suitable have from 1 to 8 carbon atoms, and preferably from 2 to 8 carbon atoms. Examples of these preferred groups of compounds include but are not limited to: magnesium, di-isopropoxide, magnesium diethoxide, magnesium ethyl carbonate, magnesium methyl carbonate, magnesium propyl carbonate, magnesium dibutoxide, magnesium diphenoxide, magnesium dinaphthenoxide and ethoxy magnesium isobutoxide. Magnesium diethoxide is particularly preferred. Magnesium compounds comprising one alkyl group and one alkoxide or aryloxide group can also be employed, as well as compounds comprising one aryl group and one alkoxide or aryloxide group. Examples of such compounds are phenyl magnesium phenoxide, ethyl magnesium butoxide, ethyl magnesium phenoxide and naphthyl magnesium isoamyloxide.

Until this time, it has been necessary to halogenate the magnesium compounds which are preferred for reaction to form the necessary magnesium halides with a halide of tetravalent titanium. The most preferred reactions are those leading to fully halogenated reaction products, i.e., magnesium-dihalides. Such halogenation reactions are suitably effected by employing a molar ratio of magnesium compound to titanium compound of 0.005:1 to 2:1, preferably 0.01:1 to 1:1. These halogenation reactions are optionally conducted in the presence of a halohydrocarbon and an electron donor. An inert hydrocarbon diluent or solvent may also be present. Suitable halides of tetravalent titanium include aryloxy- or alkoxy-di- and trihalides, such as dihexanoxy-titanium dichloride, diethoxy-titanium dibromide, isopropoxy-titanium tri-iodide and phenoxy-titanium trichloride, titanium tetrahalides are preferred. Most preferred is titanium tetrachloride.

Suitable electron donors which are used in the preparation of the solid catalyst component are ethers, esters, ketones, phenols, amines, amides, imines, nitriles, phosphines, phosphites, stibines, arsines, phosphoramides and alcoholates. Examples of suitable donors are those referred to in U.S. Pat. No. 4,136,243 or its equivalent British Specification No. 1,486,194 and in British Specification No. 1,554,340 or its equivalent German Offenlegungsschrift No. 2,729,126. Preferred donors are esters, diesters and diamines, particularly esters and diesters of aromatic carboxylic acids, such as ethyl and methyl benzoate, p-methoxy ethyl benzoate, p-ethoxy methyl benzoate, ethyl acrylate, methyl methacrylate, ethyl acetate, dimethyl carbonate, dimethyl adipate, isobutyl phthalate, dihexyl fumarate, dibutyl maleate, ethylisopropyl oxalate, p-chloro ethyl benzoate, p-amino hexyl benzoate, isopropyl naphthenante, n-amyl toluate, ethyl cyclohexanoate, propyl pivalate, N,N,N',N'-tetramethylethylenediamine, and also 1,2,4-trimethylpiperazine, 2,3,4,5-tetraethylpiperidene and similar compounds. The electron donors may be used singly or in combination. Preferred electron donors for use in preparing the titanium constituent are ethyl benzoate and isobutyl phthalate.

The halogenation normally proceeds under formation of a solid reaction product which may be isolated from the liquid reaction medium by filtration decantation or another suitable method and may be subsequently washed with an inert hydrocarbon diluent, such as n-hexane, iso-octane or toluene, to remove any unreacted material, including physically absorbed halohydrocarbon. Suitable halohydrocarbons are compounds such as butyl chloride, amyl chloride and the following more preferred compounds. Preferred aliphatic halohydrocarbons are halogen-substituted hydrocarbons with 1 to 12, particularly less than 9, carbon atoms per molecule, comprising at least two halogen atoms, such as dibromomethane, trichloromethane, 1,2-dichloroethane, dichlorobutane, 1,1,3-trichloroethane, trichlorocyclohexane, dichlorofluoroethane, trichloropropane, trichlorofluorooctane, dibromodifluorodecane, hexachloroethane and tetrachloroisooctane. Carbon tetrachloride and 1,1,3-trichloroethane are preferred aliphatic halohydrocarbons. Aromatic halohydrocarbons may also be employed, i.e., chlorobenzene, bromobenzene, dichlorobenzene, dichlorodibromobenzene, naphthyl chloride, chlorotoluene, dichlorotoluenes, and the like; chlorobenzene and dichlorobenzene are preferred aromatic halohydrocarbons. Chlorobenzene is the most preferred halohydrocarbon.

Subsequent to halogenation, the product is contacted with a tetravalent titanium halide such as a dialkoxytitanium dihalide, alkoxy-titanium trihalide, phenoxytitanium trihalide or titanium tetrahalide. The most preferred titanium compounds are titanium tetrahalides and especially titanium tetrachloride. This treatment increases the content of tetravalent titanium in the solid catalyst component. This increase should preferably be sufficient to achieve a final atomic ratio of tetravalent titanium to magnesium in the solid catalyst component of from 0.005 to 1.0 particularly of from 0.02 to 0.2. Contacting the solid catalyst component with the tetravalent titanium chloride is suitably carried out at a temperature of from 40° to 140° C. during 0.1–6 hours, optionally in the presence of an inert hydrocarbon or halohydrocarbon diluent. Particularly preferred contacting temperatures are from 70° to 120° C., and the most preferred contacting period is between 0.5 to 3.5 hours. The treatment may be carried out in successive contacts of the solid with separate portions of tetravalent titanium halide (such as $TiCl_4$) as hereinbefore described, which may contain suitable electron donors chosen from the previous list.

The treated catalyst component can be suitably isolated from the liquid reaction medium by washing to remove unreacted titanium compound from the reaction product. The titanium content of the final, washed catalyst constituent is preferably between about 1.5 to 3.6 percent by weight but can be up to about 4.5 percent by weight or more. The material used to wash the catalyst component is preferably an inert, light hydrocarbon liquid. Preferred light hydrocarbon liquids include aliphatic, alicyclic and aromatic hydrocarbons. Examples of such liquids include iso-pentane, n-hexane, iso-octane and toluene, with iso-pentane being most preferred. The amount of light hydrocarbon liquid employed can be between 5 to 100 cc/gm of procatalyst in each of 2 to 6 separate washes, and preferably about 25 cc/gm of procatalyst. The resulting solid component is the procatalyst, which is used with cocatalyst and selectivity control agent in the polymerization process.

The organoaluminum compound to be employed as cocatalyst may be chosen from any of the known activators in olefin polymerization catalyst systems comprising a titanium halide but is most suitably free of halogens. While trialkylaluminum compounds, dialkylaluminum halides and dialkylaluminum alkoxides may be used, trialkylaluminum compounds are preferred, particularly those wherein each of the alkyl groups has 2 to 6 carbon atoms, e.g., triethylaluminum, tri-n-propylaluminum, triisobutylaluminum, triisopropylaluminum and dibutyl-n-amylaluminnum. Diethyl aluminum chloride, ethyl aluminum dichloride and ethyl aluminum sesquichloride may also be used.

Suitable electron donors, which are used in combination with or reacted with an organoaluminum compound as selectivity control agents and which are also used in the preparation of the solid catalyst component are ethers, esters, ketones, phenols, amines, amides, imines, nitriles, phosphines, silanes, phosphites, stibines, arsines, phosphoramides and alcoholates. Examples of suitable donors are those referred to in U.S. Pat. No. 4,136,243 or its equivalent British Specification No. 1,486,194 and in British Specification No. 1,554,340 or its equivalent German Offenlegungsschrift No. 2,729,126. Preferred donors are esters and organic silicon compounds. Preferred esters are esters of aromatic carboxylic acids, such as ethyl and methyl benzoate, p-methoxy ethyl benzoate, p-ethoxy methyl benzoate, p-ethoxy ethyl benzoate, ethyl acrylate, methyl methacrylate, ethyl acetate, dimethyl carbonate, dimethyl adipate, dihexyl fumarate, dibutyl maleate, ethylisopropyl oxalate, p-chloro ethyl benzoate, p-amino hexyl benzoate, isopropyl naphthenate, ethyl p-toluate, n-amyl toluate, ethyl cyclohexanoate, propyl pivalate and 2,2,6,6-tetramethyl piperidine. Examples of the organic silicon compounds useful herein include alkoxysilanes and aryloxysilanes of the general formula $R^1{}_nSi(OR^2)_{4-n}$ where n is between zero and three, $R^1$ is a hydrocarbon group or a halogen atom and $R^2$ is a hydrocarbon group. Specific examples include trimethylmethoxy silane, triphenylethoxy silane, dimethyldimethoxy silane, diphenyl dimethoxy silane, phenyltrimethoxy silane, phenyltriethoxy silane and the like. The donor used as selectivity control agent in the catalyst may be the same as or different from the donor used for preparing the titanium containing constituent.

Preferred proportions of selectivity control agent, employed separately, in combination with, or reacted with an organoaluminum compound, calculated as mol per mol aluminum compound, are in the range from 0.005 to 1.5, particularly from 0.05 to 0.5. Preferred portions of selectivity control agent calculated as mol per mol Ti is in the range of 0.1 to 50, particularly 0.5 to 20. Proportions of inside electron donor contained in the solid catalyst component, calculated as mol per mol of titanium, are suitably in the range of from 0.01 to 10, e.g., from 0.05 to 5 and especially from 0.5 to 3.

To prepare the final polymerization catalyst composition, procatalyst, cocatalyst and selectivity control agent, if used separately, may be simply combined, most suitably employing a molar ratio to produce in the final catalyst an atomic ratio of aluminum to titanium of from 1 to 150, and suitably from about 10 to about 150. In general, Al:Ti ratios in the range of 30:1 to 100:1 and especially of about 50:1 to 80:1 will be found advantageous.

The reversible deactivating agent usable in the scope of the present invention is a sterically hindered phenol component. The term "phenol" will include the parent compound only, which has the structural formula:

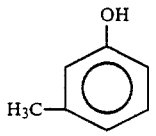

The term "substituted phenol" will refer to the group of compounds such as m-cresol, represented by the formula:

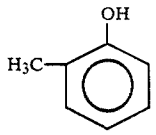

or phenols containing any ring bound substituents.

The phrase "sterically hindered phenols" will include the group of compounds which provide antioxidant stability in the resultant polymerized polymer, such as the phenols, butylated hydroxy toluene (BHT) with the structural formula:

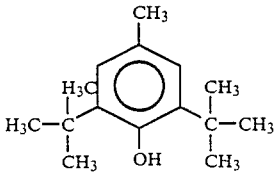

hydroxy phenols, such as resorcinol, having the structural formula:

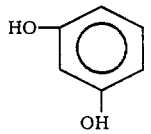

trihydroxybenezenes such as pyrogallol, having the structural formula:

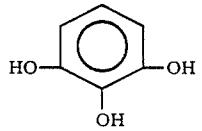

In a preferred embodiment, high molecular weight sterically hindered phenols are advantageous as reversible polymerization agents and stabilizers of the resultant product. Sterically hindered phenols having high molecular weights in the range from about 200 to about 1500 are the most preferred embodiments of the present invention. The group of high molecular weight sterically hindered phenols which includes octadecyl tetrakis [methylene (3,5-di-tert-butyl-4-hydroxy-hydrocinnamate)] methane, also known as Irganox 1010, 3,5-di-tert-butyl-4-hydroxyhydrocinnamate, also known as Ethanox 376 and 1,3,5-trimethyl-2,4,6-tris[3,5,-di-tert-butyl-4-hydroxy-benzyl] benzene also known as Ethanox 330 available from Ethyl Corporation are considered particularly useful within the scope of the present invention. Other hindered phenols and hydroxy phenols operable as antioxidants for alpha-olefins having from 2–8 carbon atoms, and particularly useful for polymerization of propylene, ethylene and 1-butene are considered within the scope of the present invention. 2,6-di-tert butyl phenol, known as Ethnox 701, and 4-methyl2-6 di-tert butyl phenol, known as Ionol are contemplated as usable herein.

The phrase "discontinued catalyst addition" refers to either of two processes:

(1) removing the bulk of polymer from a reactor vessel by inserting the polymer into the transfer line, or (2) interrupting the flow of catalyst into the reactor.

The present invention can be useful for both the polymerization and copolymerization of alpha olefins. It is contemplated as within the scope of this invention to use a major amount of one alpha olefin, such as propylene, with a minor amount of a different alpha olefin, such as ethylene, butene-1, hexene-1, octene-1, etc. in the reversible polymerization reaction.

The phenol deactivator/stabilizer of the present invention can be added into the polymerization reaction by a variety of methods. The best method for addition of the phenol depends on whether a gas phase processes is used, or whether one of the liquid phase processes is used. It is considered within the scope of the present invention to add the phenol by spray drying or by adding the phenol in neat liquid form to the polymerization reactor. If spray drying is used, it is preferred that a dilute solution of the phenol be used. The phenol could be diluted with an aromatic or aliphatic hydrocarbon such as toluene or isopentane.

Once the phenol is added to the polymerization reaction to terminate the reaction, the process is restarted by the addition of an organoaluminum component, optionally in conjunction with additional procatalyst or with a mixture of the reactor contents. It is also within the scope of the present invention that, once the phenol is added to the polymerization reaction and the process is restarted with the organoaluminum component, additional cocatalyst can be added to the reactor contents.

At least 3 methods are within the scope of the present invention:

Method 1

A method for making alpha olefin homopolymers and copolymers comprising:

(a) starting an alpha olefin polymerization reaction using a first alpha olefin monomer and using a magnesium supported titanium halide/aluminum alkyl catalyst system wherein said system comprises:
   (i) a procatalyst component;
   (ii) a cocatalyst component;
   (iii) a selectivity control agent;

(b) discontinuing addition of the procatalyst component;

(c) adding sufficient phenolic hydrocarbon to the polymerization reaction contents to terminate the reaction;

(d) adding an amount of a second alpha olefin monomer; and (e) adding an organoaluminum compound to restart the reaction.

Method 2

A method for polymerizing alpha olefins comprising:

(a) starting an alpha olefin polymerization reaction using a first alpha olefin monomer and using a magnesium supported titanium halide/aluminum alkyl catalyst system wherein said system comprises
  (i) a procatalyst component;
  (ii) a cocatalyst component;
  (iii) a selectivity control agent;
(b) discontinuing addition of the procatalyst component;
(c) adding sufficient phenolic hydrocarbon to the polymerization reaction contents to terminate the reaction;
(d) adding a mixture of said first alpha olefin monomer and a second alpha olefin monomer;
(e) adding an amount of an organoaluminum compound to restart the reaction.

Method 3

A method for polymerizing alpha olefins comprising:

(a) starting an alpha olefin polymerization reaction using a first alpha olefin monomer and a magnesium supported titanium halide/aluminum alkyl catalyst system wherein said system comprises
  (i) a procatalyst component;
  (ii) a cocatalyst component;
  (iii) a selectivity control agent;
(b) discontinuing addition of the procatalyst component;
(c) adding sufficient phenolic hydrocarbon to the polymerization reaction contents to terminate the reaction;
(d) adding a mixture of said first alpha olefin monomer and a second alpha olefin;
(e) adding an amount of an organoaluminum compound and additional procatalyst component.

The reactivator, the organoaluminum compound, can be added into the copolymerization reactor in amounts sufficient to bring the catalyst back to the proper productivity (typically about 50–100 moles aluminum per mole titanium, if an aluminum alkyl is used).

The most preferred embodiment of this invention involves a method for the production of high impact polymer which comprises a standard copolymerization of propylene, in a gas phase or in a liquid pool process, carried out under conditions to yield a homopolymer of very high isotactic index followed by the in-situ production of a rubbery random copolymer of typically ethylene and propylene.

In a batch process, the preferred embodiment involves the step wherein the second stage may be carried out in the same reactor by simply admitting mixtures of the proper comonomers, along with the appropriate molecular weight regulators and activity enhancers, to the reactor after the desired amount of homopolymer is produced. Sometimes venting of the first added monomer is needed prior to this second stage addition.

In a continuous process, it is most preferred to transfer the initial homopolymer into a second reactor wherein the rubbery copolymer is produced. In order to assure the most homogeneous and intimate mixture of rubbery copolymer, the copolymer phase should be prepared utilizing the same catalyst substrate upon which the homopolymer was produced. Because of the transitory nature and uncertain composition of the chemical environment in the transfer conduit, it is necessary to reversibly deactivate the catalyst so that no polymerization takes place in the transfer.

EXAMPLES

For a standard LIPP polymerization (Run 1) using the above described ethyl benzoate catalysts, the autoclave with a 2.5 inch paddle stirrer and a two slat baffle was charged with 2.7 l propylene and 132 mmol hydrogen, then heated to 60° C., whereupon 0.35 mmol ethyl-p-ethoxy benzoate (PEEB) was injected, followed closely by 0.70 mmol of triethylaluminum (TEA), followed by a 5% mineral oil slurry of procatalyst containing 0.01 mmol of Ti. After the initial exotherm, the reactor temperature was held at 67° C. for 1.0 hr. For some catalysts, a separate injection method may be applied, i.e. wherein a propylene hydrogen mixture at 65° C. is injected first followed by 0.14 mmol of diphenyldimethoxysilane (DPDMS) followed by 0.56 mmol of TEA followed by procatalyst slurry containing from 0.003 to 0.007 mmol of Ti. Polymerization was carried out over a two hour period.

The polymerizations of Runs 2–6 were carried out the same as Run 1 using the catalyst designated in Table 1, using the hindered phenol designated in Table 1, and wherein these components were added together with the triethyl aluminum, in the mole ratios indicated in Table 1. The polypropylene productivities were compared to that of the appropriate standard run and are shown as a percentage of that standard in the final column of Table 1. Runs 4 and 6 show the effect of added aluminum alkyl upon the depressed activities.

TABLE 1

Liquid Pool polymerization with hindered phenols using 2.71 propylene, 0.01 mmol Ti, 132 mmol hydrogen at 67° C.

| Run # | Catalyst | Phenol | Phenol/Ti mol/mol | Al/Ti mol/mol | Yield for 1 hour % of std |
|---|---|---|---|---|---|
| 1 (Standard) | A | None | — | 70 | 100 |
| 2 | A | BHT | 10 | 10 | 20 |
| 3 | A | Ethanox 330 | 20 | 20 | 24 |
| 4 | A | BHT | 67 | 67 + 15 DEAC | 150 |
| 5 | B | BHT | 20 | 20 | 1.2 |
| 6 | B | BHT | 20 | 40 | 35 |

Catalyst A is $MgCl_2/TiCl_4$/Ethyl Benzoate
Catalyst B is $MgCl_2/TiCl_4$/Isobutyl Phthalate It has been discovered that by treating catalyst B with BHT and when the phenol is added in a mole ratio of only one mole per Al, the activity is only about 1.2% of normal (Run 5). It has been found that by treating catalyst A with BHT, and when the phenol is added in a mole ratio of one mole per Al, the activity for catalyst A is about 20T of normal (Runs 2 and 3). Higher ratios may render the catalyst totally unreactive. It is also observed that adding DEAC restores full activity to catalyst A (Run 4) and that adding as little as one additional mole of triethyl aluminum (per mole of phenol) (Run 6) restores 35% of the activity of catalyst B.

It will be obvious to those skilled in the art that various modifications can be made in the process of the invention without departing from the scope or spirit of the invention.

I claim:

1. A method for polymerizing alpha olefins comprising:

(a) starting an alpha olefin polymerization reaction using a first alpha olefin monomer and using a magnesium supported titanium halide/aluminum alkyl catalyst wherein said catalyst comprises:
  (i) a procatalyst component obtained by halogenating a magnesium compound with a halide of tetravalent titanium;
  (ii) a cocatalyst component comprising an organoaluminum compound; and
  (iii) a selectivity control agent;
(b) discontinuing addition of the procatalyst component;
(c) adding sufficient sterically hindered aluminum free phenolic hydrocarbon to the polymerization reaction contents to terminate the reaction;
(d) adding an amount of a second alpha olefin monomer; and
(e) adding an organoaluminum compound to restart the reaction.

2. A method for polymerizing at least one alpha olefin monomer comprising:

(a) starting an alpha olefin polymerization reaction using a first alpha olefin monomer and using a magnesium supported titanium halide/aluminum alkyl catalyst wherein said catalyst comprises:
  (a) a procatalyst component obtained by halogenating a magnesium compound with a halide of tetravalent titanium;
  (ii) a cocatalyst component comprising an organoaluminum compound; and
  (iii) a selectivity control agent;
(b) discontinuing addition of the procatalyst component;
(c) adding sufficient sterically hindered aluminum free phenolic hydrocarbon to the polymerization reaction contents to terminate the reaction;
(d) adding an amount of a second alpha olefin monomer; and
(e) adding an organoaluminum compound to restart the reaction.

3. A method for polymerizing at least one alpha olefin monomer comprising:

(a) starting an alpha olefin polymerization reaction using a first alpha olefin monomer and using a magnesium supported titanium halide/aluminum alkyl catalyst wherein said catalyst comprises:
  (i) a procatalyst component obtained by halogenating a magnesium compound with a halide of tetravalent titanium;
  (ii) a cocatalyst component comprising an organoaluminum compound;
  (iii) a selectivity control agent;
(b) discontinuing addition of the procatalyst component;
(c) adding sufficient sterically hindered aluminum free phenolic hydrocarbon to the polymerization reaction contents to terminate the reaction;
  (d) adding a mixture of said first alpha olefin monomer and a second alpha olefin monomer;
(e) adding an amount of an organoaluminum compound and additional procatalyst component.

4. The method of any one of claim 1, 2, and 3 wherein the first olefin monomer of the olefin polymerization is propylene or propylene together with a minor amount of a copolymnerizable alpha olefin.

5. The method of any one of claims 1, 2, and 3 wherein the phenol is a sterically hindered high molecular weight phenol.

6. The method of any one of claims 1, 2, and 3, wherein the phenol is a member of the group consisting of octadecyl 3,5-di-tert-butyl-4-hydroxyhydrocinnamate, tetrakis [methylene (3,5-di-tert-butyl-4-hydroxyhydrocinnamate)] methane, and 1,3,5-trimethyl-2,4,6-tris [3,5,-di-tert-butyl-4-hydroxy-benzyl] benzene.

7. The method of any one of claims 1, 2, and 3, wherein the phenol is a member of the group consisting of 2,6-di-tert-butyl phenol, and 4-methyl-2,6-di-tert-butyl phenol.

8. The method of any one of claims 1, 2, and 3, wherein the organoaluminum compound of step (e) is an aluminum alkyl.

9. The method of any one of claims 1, 2, and 3, wherein at least one of the alpha-olefin monomers is butene-1.

10. The method of any one of claims 1, 2, and 3, wherein the phenol is added by spraying the phenol onto the contents of the polymer reactor.

11. The method of any one of claims 1, 2, and 3, wherein the phenol is added in neat liquid form to the polymer reactor.

12. The method of any one of claims 1, 2, and 3, further comprising venting any excess first monomer after the phenol is added to the reactor contents.

13. The method of claim 3, wherein said additional procatalyst is a member of the group consisting of members (I) and (II), wherein member (I) is a composition prepared by reacting a solid component obtained by halogenating a magnesium compound of the formula Mg R′R″, wherein R′ is an alkoxide, alkyl carbonate or aryloxide, and R″ is an alkoxide, alkyl carbonate or an aryloxide group or a halogen, with a halide of tetravalent titanium, reacting this product with a first electron donor and then with a second electron donor therein forming a halogenated product, and therein reacting said halogenated product with a halide of tetravalent titanium, and wherein member (II) is a composition comprising: (a) a reaction product of an organoaluminum compound and an electron donor, and (b) a solid component which has been obtained by halogenating a magnesium compound with the formula Mg $R_1R_2$ wherein $R_1$ is an alkyl, aryl, alkoxide or aryloxide group, and $R_2$ is an alkyl, aryl, alkoxide or aryloxide group or halogen, with a halide of tetravalent titanium in the presence of a halohydrocarbon, and contacting the halogenated product with a tetravalent titanium compound.

* * * * *